T. J. MARTIN.
WINDOW GLASS SILENCER.
APPLICATION FILED APR. 6, 1920.
1,363,528.
Patented Dec. 28, 1920.
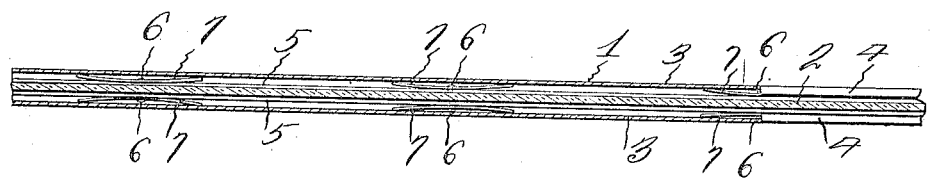
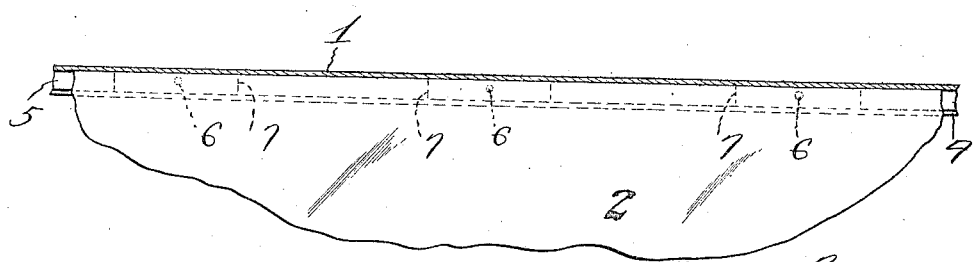
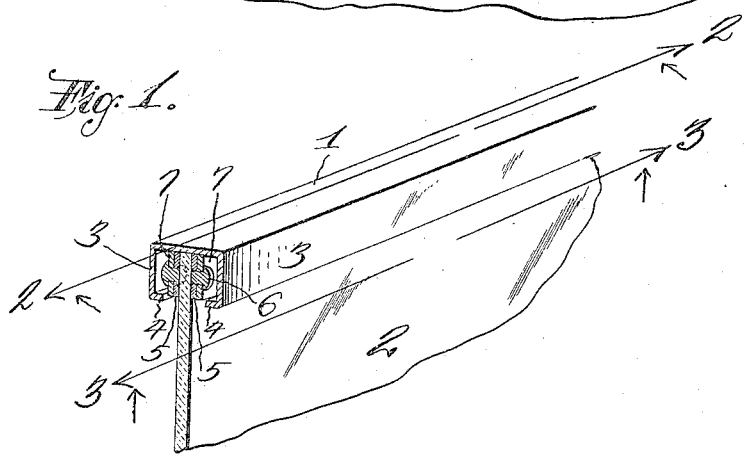
Inventor
Truman T. Martin
By D. Swift
his Attorney

UNITED STATES PATENT OFFICE.

TRUMAN J. MARTIN, OF ALLENTOWN, PENNSYLVANIA.

WINDOW-GLASS SILENCER.

1,363,528.  Specification of Letters Patent.  Patented Dec. 28, 1920.

Application filed April 6, 1920. Serial No. 371,654.

*To all whom it may concern:*

Be it known that I, TRUMAN J. MARTIN, a citizen of the United States, residing at Allentown, in the county of Lehigh, State of Pennsylvania, have invented a new and useful Window-Glass Silencer; and I do hereby declare the following to be a full, clear, and exact description of the invention, such as will enable others skilled in the art to which it appertains to make and use the same.

The invention relates to glass silencers and is particularly adapted for use in connection with windshield frames of motor driven vehicles wherein the glass is usually held in the channel of the frame by engaging strips of felt, or other packing. Where felt or other packing is used, the packing eventually deteriorates to such an extent that an objectionable rattle of the glass within the window frame develops, therefore it is the object of the invention to provide spring means for holding the marginal edges of the glass in the frame of the window so that the glass will be frictionally and mechanically held at all times, thereby obviating rattling and at the same time insuring a tight binding of the marginal edges of the glass.

A further object is to provide a glass holding channel formed from a U-shaped member between the flanges of which the marginal edge of a glass is received and to provide strips adapted to engage the sides of the glass and be frictionally and mechanically forced into engagement with the glass by means of bowed springs carried by the strips and having their ends in engagement with the flanges of the channel. Also to provide the flanges of the channel with inturned flanges, which flanges engage under the ends of the bowed springs for preventing displacement of the springs and also for limiting the movement of the glass under pressure on either side thereof.

With the above and other objects in view the invention resides in the combination and arrangement of parts as hereinafter set forth, shown in the drawings described and claimed, it being understood that changes in the precise embodiment of the invention may be made within the scope of what is claimed without departing from the spirit of the invention.

In the drawings:—

Figure 1 is a perspective view of a portion of the channel showing a piece of glass held therein.

Fig. 2 is a sectional view taken on line 2—2 of Fig. 1.

Fig. 3 is a sectional view taken on line 3—3 of Fig. 1 looking in the direction of the arrows.

Referring to the drawings, the numeral 1 designates a channel and 2 a portion of a sheet of glass to be held within the channel 1. The channel 1 comprises the flanges 3 which are preferably parallel with each other and are provided with inturned flanges 4. The flanges 3 are spaced from the surfaces of the glass 2 so that the glass engaging strips 5 may be interposed between the flanges and the glass and at the same time allow space between the strips and the flanges so that a certain amount of movement will be allowed to the glass before the glass comes into contact with the flanges 4. The strips 5 are preferably metallic strips and have secured to them at spaced intervals by means of rivets 6 bowed springs 7. The ends of the bowed springs engage the inner face of the flanges 3 and form means whereby the strips 5 are maintained in frictional engagement with the marginal edge of the glass so that rattling of the glass will be prevented. By providing the flanges 4 it will be seen that the upward movement of the channel 1 as a whole will be prevented for the reason that said flanges will come into contact with the ends of the bowed springs 7. It will also be seen that when the glass is not in position between the strips 5 that said strips will be forced into engagement with each other by the bowed springs 7, however when it is desired to place the marginal edge of the glass 2 in position between the strips 5 it will only be necessary to insert a tool between said strips so that they may be spread apart, then insert one portion of the marginal edge of the glass and force the glass into the channel, which action will cause the strips to spread apart for their entire length and receive the glass between the strips where it will be frictionally held by the springs 7 against displacement.

From the above it will be seen that a silencer for window glass is provided, which silencer is positive in its action and is concealed from view at all times. It will be seen that by providing the springs 7 and the strips 5 that the strips will be forced into engagement with the glass around its entire marginal edge, thereby accommodating the silencer to the different thicknesses of various parts of the glass. It will also be seen that the danger of breaking the glass is reduced to a minimum for the reason that the same is resiliently supported and will give slightly under pressure applied to the glass.

The invention having been set forth what is claimed as new and useful is:—

1. A channel for glass comprising a U-shaped member, the flanges of the U-shaped member being spaced apart and adapted to receive therebetween the marginal edge of a glass, said flanges being so spaced that they will be spaced from the surfaces of the glass when the glass is received by the channel, strips engaging the marginal sides of the glass, bowed springs secured to said strips and having their free ends extending outwardly and engaging the inner faces of the flanges for holding the strips in engagement with the glass, and inwardly extending flanges carried by the flanges of the U-shaped member for engaging under the free ends of the bowed springs for preventing the removal of the U-shaped member without the movement of the strips and bowed springs.

2. A channel for glass, said channel comprising a member having spaced flanges between which the glass is disposed, strips engaging the glass on each side thereof, bowed springs interposed between the strips and the inner surfaces of the flanges, said bowed springs being centrally secured to the strips and having their free ends extending outwardly into engagement with the flanges for frictionally and mechanically binding the glass between the strips.

In testimony whereof I have signed my name to this specification in the presence of two subscribing witnesses.

TRUMAN J. MARTIN.

Witnesses:
HELEN R. OBERLY,
MINNIE H. BECKER.